United States Patent
Markin et al.

(10) Patent No.: US 10,467,491 B2
(45) Date of Patent: Nov. 5, 2019

(54) SYSTEM AND METHOD FOR DETECTING FORGERIES

(71) Applicant: Au10tix Limited, Nicosia-Cyprus (CY)

(72) Inventors: Sergey Markin, Herzeliya (IL); Ron Atzmon, Tel Aviv (IL); Yael Moscovitz, Mevaseret Zion (IL); Benjamin Neeman, Raanana (IL); Michael Blumberg, Hadera (IL)

(73) Assignee: AU10TIX Limited, Nicosia-Cyprus (CY)

(*) Notice: Subject to any disclaimer, the term of this patent is extended or adjusted under 35 U.S.C. 154(b) by 353 days.

(21) Appl. No.: 15/590,480

(22) Filed: May 9, 2017

(65) Prior Publication Data

US 2017/0330047 A1    Nov. 16, 2017

(30) Foreign Application Priority Data

May 11, 2016  (IL) .......................................... 245623

(51) Int. Cl.
*G06K 9/20* (2006.01)
*B42D 25/30* (2014.01)
(Continued)

(52) U.S. Cl.
CPC ........... *G06K 9/2054* (2013.01); *B42D 25/30* (2014.10); *G06K 9/00483* (2013.01);
(Continued)

(58) Field of Classification Search
CPC ........... B42D 25/30; G06K 2009/0059; G06K 2209/01; G06K 9/00483; G06K 9/2018;
(Continued)

(56) References Cited

U.S. PATENT DOCUMENTS 9,081,988 B2    7/2015    Dolev
2007/0047008 A1*    3/2007    Graham ................. G06K 9/325
358/401
(Continued)

FOREIGN PATENT DOCUMENTS

WO    2011/058554 A1    5/2011
WO    2013/014667 A2    1/2013

OTHER PUBLICATIONS

Coaxlink Quad G3 DF, sales.americas@euresys.com, Retrieved Nov. 29, 2017.

(Continued)

*Primary Examiner* — Manuchehr Rahmjoo
(74) *Attorney, Agent, or Firm* — Oliff PLC

(57) ABSTRACT

A document forgery detection method comprising using at least one processor for providing at least one histogram of gray level values occurring in at least a portion of at least one channel of an image assumed to represent a document including text, the histogram having been generated by image processing at least a portion of at least one channel of an image assumed to represent a document including text, the image having been sent by a remote end user to an online service over a computer network, evaluating monotony of at least a portion of the at least one histogram; and determining whether the image is authentic or forged based on at least one output of the evaluating.

15 Claims, 3 Drawing Sheets

(51) Int. Cl.
*G06K 9/00* (2006.01)
*G06K 9/34* (2006.01)
*G06K 9/38* (2006.01)
*G06K 9/46* (2006.01)
*G07D 7/202* (2016.01)
*G07D 7/00* (2016.01)
*G07D 7/1205* (2016.01)

(52) U.S. Cl.
CPC ........... *G06K 9/2018* (2013.01); *G06K 9/344* (2013.01); *G06K 9/38* (2013.01); *G06K 9/4642* (2013.01); *G06K 9/4652* (2013.01); *G07D 7/003* (2017.05); *G07D 7/1205* (2017.05); *G07D 7/205* (2013.01); *G06K 2009/0059* (2013.01); *G06K 2209/01* (2013.01)

(58) Field of Classification Search
CPC ........ G06K 9/2054; G06K 9/344; G06K 9/38; G06K 9/4642; G06K 9/4652; G07D 7/003; G07D 7/1205; G07D 7/205
See application file for complete search history.

(56) References Cited

U.S. PATENT DOCUMENTS

| | | |
|---|---|---|
| 2008/0025556 A1 | 1/2008 | Visan et al. |
| 2014/0180981 A1 | 6/2014 | Dolev et al. |
| 2016/0014301 A1 | 1/2016 | Wang et al. |

OTHER PUBLICATIONS

Lampert et al., Christoph H.: "Printing Technique Classification for Document Counterfeit Detection", Computational Intelligence and Security, 2006 International Conference on, IEEE, PI, Nov. 1, 2006 (Nov. 1, 2006), pp. 639-644, XP031012876, ISBN: 978-1-4244-0604-3.

\* cited by examiner

FIG. 1

10. Set-up analysis to determine and store in computer data storage, suitable threshold value for monotony parameter M, preferably separately for each of documents known to be of plural document types e.g. French passport series 3, Spanish driving license series 4.

↓

20 for each document in stream of documents received by a server of an online service, from remote persons, via a computer network, do steps 30 – 110 e.g. at the server

↓

30: recognize document type e.g. using any suitable machine-learning based technique such as any of those described in co-owned Published European Patent Application EP2737437, entitled "System And Methods For Computerized Machine-Learning Based Authentication Of Electronic Documents…" and retrieve threshold value for monotony parameter M accordingly using values stored in operation 10

↓

50. identify "field/s to be checked" within visual image of passport (say) e.g. by using text-identification technology to find at least one string of blobs believed to be a text.

↓

60: for each "field to be checked", do operations 70 – 100

↓

70: define window e.g. find mean character width of text in document then window width = predetermined multiple of mean character width e.g. 2 or 2.5 or 3. If resulting window area is too small (compared to pre-determined minimal window area e.g. 1000 or 1300 or 1500 pixels) increase window width until resulting window area is at least the pre-determined minimal window area.

↓

80. use at least one and typically all 3 of the 3 channels in visual image (r, g, b) to make an entropy-based authentic/forged decision (e.g. as per Fig. 2) for each of plural positions 1, ..P, P+1,… of the window. decisions may include a third interim value e.g. authentic/inconclusive/forged.

↓

90. combine authentic/forged decisions over all positions 1, ..P, P+1,… of the window within the channel/each of the channels, thereby to yield a per-field, per-channel entropy-based authentic/forged decision.

↓

100. if plural channels from among the 3 channels in the visual image (r, g, b) were used, suitably combine the channels' entropy-based authentic/forged decisions per field. For example, the method may output that a certain field is "forged" if at least one of the 3 channels yields a "forged" decision in operation G (when Fig. 2 is used to perform operation 80 in the current iteration).

↓

110: if all fields are deemed authentic, output "document is authentic". Else, output "document is forged"

FIG. 2

AA  for current (e.g., initially, first) position P of moving window do operations A - H
↓
A  Compute the histogram of all gray level values of all pixels in the field to be checked.
↓
B  compute a threshold which best separates the histogram of operation A two classes. For example, Otsu's method is a method known in the art for binarizing an input graylevel image by performing clustering-based thresholding. The input graylevel image typically contains 2 relatively well differentiated classes of pixels: foreground pixels and background pixels. Otsu's method computes a threshold which is suitable for separating the pixels into two classes:
   i. minimizes intra-class variance e.g. minimizes the standard deviation(std) of each of the two clusters, or
   ii. maximizes inter-class variance.
↓
C  partition the histogram according to the threshold thereby to define left and right histograms. Assume the left histogram is the foreground (text) whereas the right histogram is the background (non-text, which is normally to the right because the non-text is normally bright whereas the text is normally darker (e.g. black)).
↓
D  normalize the text (e.g. Left) histogram by dividing each of the pixel values in the text (e.g. Left) histogram by the sum of all pixel values in the text (e.g. Left) histogram
↓
E  extract text monotony indicator typically from text (e.g. Left) histogram e.g. compute entropy of the text (e.g. Left) histogram
↓
F  normalize the text monotony indicator so artifacts of the text monotony indicator computation process do not affect the text monotony indicator's value. For example, if a e.g. left histogram entropy value is used, normalize same to the number of the bins in the left histogram e.g. e.g. as described in Fig. 3, so that number of bins does not affect entropy value.
↓
G.  compare normalized entropy (say) found in operation F to monotony parameter Threshold/s (or more generally, text monotony indicator threshold/s) determined in operation 10, thereby to make a binary authentic/forged decision (or tertiary authentic/inconclusive/forged decision
↓
H.  increment window position P := P + 1

FIG. 3

F1. compute the width (W) of the middle 90% (say) of the bins in the text (e.g. Left) histogram.

↓

F2. compute M = H / log(W) yielding a normalized value between 0 and 1 which indicates an extent to which the text (e.g. Left) histogram is monotonic.

SYSTEM AND METHOD FOR DETECTING FORGERIES

REFERENCE TO CO-PENDING APPLICATIONS

No priority is claimed.

FIELD OF THIS DISCLOSURE

The present invention relates generally to authentication and more particularly to computerized authentication.

BACKGROUND FOR THIS DISCLOSURE

Conventional technology constituting background to certain embodiments of the present invention is described in the following publications inter alia:

A computerized integrated authentication/document bearer verification system is described in co-pending Published PCT application, WO 2011058554 A1.

Computerized authentication of electronic documents is described in co-owned U.S. Pat. No. 9,081,988.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide an image processing procedure to detect text replacement forgeries using visual (VIS) images of documents in which text may have been replaced.

Certain embodiments of the present invention seek to provide a system and method configured to determine whether or not a text field in a document is forged.

Certain embodiments of the present invention seek to provide forgery detection in documents arriving over channels which are unsupervised and electronic.

Certain embodiments of the present invention seek to analyze at least a portion of a digital image including treating at least some of the image's pixels as a population where each of the pixels in the population is characterized by a characteristic such as but not limited to that pixel's gray level.

Certain embodiments of the present invention seek to provide at least one processor in data communication with at least one memory, with instructions stored in such memory executed by the processor to provide functionalities which are described herein in detail.

The present invention typically includes at least the following embodiments: Embodiment 1: according to any of the preceding embodiments.

Embodiment 1

A document forgery detection method comprising using at least one processor for:

providing at least one histogram of gray level values occurring in at least a portion of at least one channel of an image assumed to represent a document including text, the histogram having been generated by image processing at least a portion of at least one channel of an image assumed to represent a document including text, the image having been sent by a remote end user to an online service over a computer network;

evaluating monotony of at least a portion of the at least one histogram; and determining whether the image is authentic or forged based on at least one output of the evaluating.

Embodiment 2

A method according to any of the preceding embodiments wherein the image processing at least a portion of an image comprises identifying an image portion by identifying at least one line of text in the image.

Embodiment 3

A method according to any of the preceding embodiments wherein the evaluating monotony of at least a portion of the at least one histogram includes identifying plural peaks in at least a portion of the histogram using an automated technology for dividing a dataset into clusters.

Embodiment 4

A method according to any of the preceding embodiments wherein the automated technology for dividing a dataset into clusters is used to determine a cut-off point separating the histogram into plural classes, for each of multiple positions of a moving window passing over at least a portion of the image.

Embodiment 5

A method according to any of the preceding embodiments wherein the image processing comprises identifying at least one line of text in the image and wherein the moving window passes over the line of text.

Embodiment 6

A method according to any of the preceding embodiments wherein the evaluating monotony comprises computing entropy of at least a portion of a second histogram derivable from the at least one histogram and comparing a value derivable from the entropy to a predetermined threshold.

Embodiment 7

A method according to any of the preceding embodiments wherein the second histogram derivable from the at least one histogram is generated by normalizing the at least one histogram.

Embodiment 8

A method according to any of the preceding embodiments wherein the value is derived by normalizing the entropy.

Embodiment 9

A method according to any of the preceding embodiments wherein the automated technology for dividing a dataset into clusters comprises at least one of the following data clustering technologies: Otsu, Jenks, Jenks-Fisher.

Embodiment 10

A method according to any of the preceding embodiments wherein the image processing and the evaluating are performed for plural portions of at least one channel of the image, thereby to define plural outputs of the evaluating and wherein the determining includes combining the plural outputs.

Any suitable process may be used for combining the plural outputs e.g. averaging, or determining authentic/forged for each portion from among the plural portions separately, then deeming the image authentic only if none of the portions are deemed forged.

Embodiment 11

A method according to any of the preceding embodiments wherein the image processing and the evaluating are performed for at least one portion of plural channels of the image, thereby to define plural outputs of the evaluating and wherein the determining includes combining the plural outputs.

Any suitable process may be used for combining the plural outputs e.g. averaging, or determining authentic/forged for each channel from among the plural channels separately, then deeming the image authentic only if none of the channels are deemed forged.

Embodiment 12

A document forgery detection system operative in conjunction with an online service and a computer network, the system comprising:

An image processor configured to image process at least a portion of at least one channel of an image assumed to represent a document including text, the image having been sent by a remote end user to the online service over the computer network, the image processing including generating at least one histogram of gray level values occurring in at least a portion of at least one channel of the image; and an output generator operative to make a determination of whether the image is authentic or forged based on at least one output of a monotony evaluating processor configured to evaluate monotony of at least a portion of the at least one histogram; and to provide the determination to the online service.

Embodiment 13

A system according to any of the preceding embodiments and also comprising a monotony evaluating processor configured to evaluate monotony of at least a portion of the at least one histogram and to provide at least one output accordingly, to the output generator.

Embodiment 14

A system according to any of the preceding embodiments wherein the monotony evaluating processor uses entropy as a diversity indicator.

Embodiment 15

A system according to any of the preceding embodiments wherein the entropy comprises Shannon entropy.

Embodiment 16

A method according to any of the preceding embodiments wherein the providing comprises image processing at least a portion of at least one channel of an image assumed to represent a document including text, the image having been sent by a remote end user to an online service over a computer network, thereby to generate the at least one histogram of gray level values occurring in at least a portion of at least one channel of the image.

Embodiment 17

A computer program product, comprising a non-transitory tangible computer readable medium having computer readable program code embodied therein, the computer readable program code adapted to be executed to implement a document forgery detection method comprising using at least one processor for:

providing at least one histogram of gray level values occurring in at least a portion of at least one channel of an image assumed to represent a document including text, the histogram having been generated by image processing at least a portion of at least one channel of an image assumed to represent a document including text, the image having been sent by a remote end user to an online service over a computer network;

evaluating monotony of at least a portion of the at least one histogram; and determining whether the image is authentic or forged based on at least one output of the evaluating.

Also provided, excluding signals, is a computer program comprising computer program code configured to perform any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input device/s may be used to process, display e.g. on a computer screen or other computer output device, store, and accept information such as information used by or generated by any of the methods and apparatus shown and described herein; the above processor/s, display and input device/s including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication device/s, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 1 is a simplified flowchart illustration of a method for detection of replacement text, in accordance with certain embodiments.

FIG. 2 is a simplified flowchart illustration of a method for entropy-based authentic/forged decision making.

FIG. 3 is a simplified flowchart illustration of an entropy normalization method.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware component and vice-versa. Any logical functionality described herein may be implemented as a real time application if and as appropriate and which may employ any suitable architectural option such as but not limited to SPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, an authentication system and method is provided which relies on empirical observation, that in a forgery, the contrast between an alphanumeric character and its surroundings is normally small relative to the contrast between an alphanumeric character and its surroundings in an authentic document. An entropy-based authentication method may then differentiate authentic documents from forged documents by identifying documents for which entropy is relatively small since an empirical observation indicates that sharp edges of alphanumeric characters are characteristic of forgeries, whereas soft edges of alphanumeric characters are characteristic of authentic documents.

Automated authentication of remotely presented ID documents such as passports or driving licenses is extremely important for regulatory aspects of, say, electronic banking including e-payment of salaries, commerce and gaming Internet applications all of which have become exceptionally prevalent. Even social networks use remotely presented ID documents e.g. to authenticate an end-user who claims to have forgotten her or his password. Remotely presented ID documents may also be used as a condition for enrollment—say, to Google Wallet.

Authentication techniques capable of detecting remotely presented ID documents which are partially or completely forged are useful e.g. because their existence would force would-be imposters to simply purchase documents, issued with particulars suitable for their needs, from corrupt government or corporate officials, a problem which is more tractable for law enforcement officials to handle. While authenticating remotely presented ID documents might be expected to be simple, since authentication is a well established field, upon examination the task becomes more elusive. Security patterns cannot be easily identified, nor can forgery tests based on features visible only in IR or UV normally be performed, if end users are doing their own scanning of their own documents in visible light, and no IR or UV scans are available. Illumination is non-uniform over documents and often poor when mobile phones or tablets are used outside or in an artificially lit room to scan ID documents. Also, the end-user may have availed her- or himself of the opportunity to post-process her or his document.

A document may be presented for remote authentication after using a graphic editor such as but not limited to GIMP, Adobe Photoshop, Pizap, Microsoft Publisher, Picasa, to electronically post-process an input digital image e.g. to type new text data to replace a text data field to be forged in the input image, and then to send the electronically post-processed image over a computer network e.g. www or Internet, for remote authentication.

A DLN field (or other field including text) may be regarded as including two images, foreground (text) and background (non-text). Examination of authentic vs. forged DLN fields may yield that an authentic field has a relatively continual/continuous appearance (e.g. edges between text and background are soft) while the forged image does not; typically the background is smooth whereas the foreground is a graphic layout which is not smoothed. Diversity indices are known, e.g. Shannon (and other measures of) entropy is a known diversity index especially in the ecological literature, and according to certain embodiments, a forgery test may be performed based on use of entropy to distinguish between post-processed hence forged images (e.g. of ID documents) and smoother raw hence authentic images (e.g. of ID documents).

Such forgeries may be detected using image-processing by histogramming the color values of the DLN field, e.g. generating a histogram of the color values of the DLN field, separately for each of the 3 channels included in each color value i.e. separately for the r, g and b channels. for example, the histogram for the green channel of an image (array of 8-bit pixels e.g.) may have 256 (2 exp 8) bins, or less, each corresponding to one, or more, of the possible green values that a pixel might have. The histogram may for example have 256 columns, respectively graphing the number of pixels in the image with the $1^{st}$, $2^{nd}$, . . . $256^{th}$ green values. These pixels are said to respectively belong to the $1^{st}$, $2^{nd}$, . . . $256^{th}$ "bins".

A forged/authentic indication may then be obtained by inspecting (manually or using a suitably configured processor) to determine how monotonic the histogram is. A monotonic histogram (having a relatively high monotony parameter M) may drive a conclusion that the DLN field from which the monotonic histogram was generated, is authentic. In contrast, if a histogram has 2 peaks, this indicates that the DLN field from which the non-monotonic double-peaked histogram was generated, includes two separate images with no data (no color values) between the two images. This may drive a conclusion that the DLN field from which the monotonic histogram was generated, is forged. In such cases, the value of monotony parameter M is typically relatively low.

The term "high monotony" is intended herein to include a characterization of a document in which the transition between foreground and background (e.g. between text and non-text) is gradual or continuous as opposed to a document characterized by 'low monotony' in which the transition between foreground and background (e.g. between text and non-text) is sharp or discontinuous.

FIG. 1 is a simplified flowchart illustration of a method for detection of replacement text, in accordance with certain embodiments. The method of FIG. 1 may include all of or any subset of the following operations 10-110, suitably ordered e.g. as shown.

Operation 10. Set-up analysis to determine and store in computer data storage, suitable threshold value for monotony parameter M, preferably separately for each of documents known to be of plural document types e.g. French passport series 3, Spanish driving license series 4.

Operation 20. For each document in stream of documents received by a server of an online service, from remote persons, via a computer network, do steps 30-110 e.g. at the server Operation 30: recognize document type e.g. using any suitable machine-learning based technique such as any of those described in co-owned Published European Patent Application EP2737437, entitled "System And Methods For Computerized Machine-Learning Based Authentication Of Electronic Documents . . . " and retrieve threshold value for monotony parameter M accordingly using values stored in operation 10.

Operation 50. identify "field/s to be checked" within visual image of passport (say) e.g. by using text-identification technology to find at least one string of blobs believed to be a text.

Operation 60: for each "field to be checked", do operations 70-100

Operation 70: define window e.g. find mean character width of text in document then window width=predetermined multiple of mean character width e.g. 2 or 2.5 or 3. If resulting window area is too small (compared to pre-determined minimal window area e.g. 1000 or 1300 or 1500 pixels) increase window width until resulting window area is at least the pre-determined minimal window area.

Operation 80. use at least one and typically all 3 of the 3 channels in visual image (r, g, b) to make an entropy-based authentic/forged decision (e.g. as per FIG. 2) for each of plural positions 1, . . . P, P+1, . . . of the window. decisions may include a third interim value e.g. authentic/inconclusive/forged.

Operation 90. combine authentic/forged decisions over all positions 1, . . . P, P+1, . . . of the window within the channel/each of the channels, thereby to yield a per-field, per-channel entropy-based authentic/forged decision.

Operation 100. if plural channels from among the 3 channels in the visual image (r, g, b) were used, suitably combine the channels' entropy-based authentic/forged decisions per field. For example, the method may output that a certain field is "forged" if at least one of the 3 channels yields a "forged" decision in operation G (when FIG. 2 is used to perform operation 80 in the current iteration).

Operation 110: if all fields are deemed authentic, output "document is authentic". Else, output "document is forged".

Operations other than some which are self-explanatory are now described in detail, according to certain embodiments:

Operation 10: This operation may include set-up analysis to determine a suitable threshold value for monotony parameter M. For example, a first set of documents known to be authentic and a second set of documents known to be forged (e.g. by actually forging electronic representations of authentic documents using post-processing), may be provided.

Typically, for each document type T to be supported, perform operations 60-100 below for each document in set1 (known to be authentic) and set2 (known to be forged), several times, each time using a different candidate M threshold, yielding several output results respectively, and select an M threshold from among the several candidate M threshold values which is optimal e.g. minimizes type 1 and/or 2 errors. Suitable candidate M threshold values may for example be values which suitably span a range of 0.5-0.7, or a range of 0.4-0.8, or any other suitable range which is believed to include the desired optimized M threshold value.

According to certain embodiments, first and second (electronic) document sets as above may be generated separately for each of many known types of documents such as a French driving license, series 3 or an Indonesian passport, series 4. Alternatively or in addition, first and second document sets as above may be generated separately for each of many known document substrates e.g. documents known to be printed on paper vs. those known to be printed on plastic.

The first and second sets of documents may be electronic documents previously categorized (by an "oracle" process e.g. suitable machine (forensic) or human inspection) as belonging to certain document types or document substrates and as being authentic or forged. Alternatively or in addition, the first (authentic) set of documents may include authentic physical documents of various types or substrates to be supported which are procured and scanned. Alternatively or in addition, electronic documents known to be authentic copies of physical documents of various types or substrates may be forged using post-processing, thereby to generate the second (forged) set of documents.

The gray level values in each document in each of the first and second sets is clustered, using a suitable data clustering technology such as but not limited to: Otsu, Jenks, Jenks-Fisher, subject to various values for monotony parameter M in operation G described herein, and select the value for M which minimizes type 1 and/or type 2 errors e.g. maximizes probability of finding real forgeries and simultaneously minimizes probability of false alarms.

Any suitable criterion may be employed to determine which of several tested values of M is optimal. For example, clearly inferior values of M may first be filtered out e.g. if two values 1, 2 for M are tested and the second value has a higher rate of type 1 errors and a higher rate of type 2 errors than the first value does, the second value for M may be deemed inferior and removed from further consideration. To select a final value for M from among a remaining set of values of M none of which are clearly inferior to any other, the cost of type 1 errors relative to the cost of type 2 errors for a specific application or use-case may be determined; this allows the cost effectiveness of the various values of M to be determined and the most cost effective value for M to be selected.

Operation 50: This operation may include identifying "field to be checked" within visual image of passport (say) e.g. by using text-identification technology to find a string of blobs believed to be a text.

Any suitable conventional connected component labeling may be employed to detect blobs each of which represents a separate letter, e.g. any suitable text-identification technologies used in an OCR context. For example, OpenCV, supported by Willow Garage and Itseez, is publicly available software which has a contour function operative to detect blobs. EasyOCR, commercially available e.g. by contacting sales.americas@euresys.com, is a printed character reader which uses blob analysis functions to segment an image.

Computer Vision System Toolbox™ is a commercially available software product which includes an OCR function which recognizes text in images for various computer vision applications.

Operation 70: This operation may use at least one and typically all 3 of the 3 channels in visual image (r, g, b) to make an entropy-based authentic/forged decision e.g. using all or any subset of the operations included in the method of FIG. 2. For example, the pixel values in the 3 channels may be suitably combined into a single pixel value. Alternatively, the method of FIG. 2 may be performed for only one of, or each of, the 3 channels in visual image.

Any suitable method may be employed at any suitable stage in this workflow, to determine the mean character width for use in operation 70. For example, this parameter may be pre-stored per document type, or may be determined on the fly using image processing in real time (e.g. determine average width of blobs identified in operation 50.

Operation 90: Any suitable combination technique may be employed in performing this operation. For example, assuming that the range of candidate M threshold values is the range between x1=0.7 and x2=0.5, If at least 1 monotony parameter value for at least one window is below x2, the document may be considered to be forged. If some values fall within range {x1,x2} determine how many (i.e. which percentage of the total number of values computed, fall within this range). If the percentage is not large, e.g. less than a predetermined cut-off percentage threshold such as 40% or 60% or some predetermined cut-off percentage threshold therebetween, assume the document is authentic. If the percentage is large, assume the document is forged. For example if the predetermined cut-off percentage threshold is 50% (although this is of course a parameter which may be determined entirely independently of the value of x2) and the values computed are 0.9; 0.8; 0.75; 0.9; 0.55; 0.65 then the document may be deemed to be authentic because most of the 7 windows' monotony parameters (more than 50%) exceed x1. If the values are 0.9; 0.8; 0.75; 0.9; 0.45; 0.9 the document is forged because one value is below 0.5. If the values are 0.6; 0.6; 0.75; 0.9; 0.55; 0.65 the document is deemed forged because most of the 7 windows' monotony parameters (more than 50%) are between x1 and x2

Operation 100. In this operation, if plural channels from among the 3 channels in the visual image (r, g, b) were used to make an entropy-based authentic/forged decision, the method may suitably combine the decisions. For example, the method may output "forged" if at least one of the 3 channels yields a "forged" decision in operation G.

FIG. 2 is a simplified flowchart illustration of a method for entropy-based authentic/forged decision making. The method of FIG. 2 may include all of or any subset of the following operations AA, A-H, suitably ordered e.g. as shown:

Operation AA. for current (e.g., initially, first) position P of moving window do operations A-H Operation A Compute the histogram of all gray level values of all pixels in the field to be checked.

Operation B compute a threshold which best separates the histogram of operation A two classes.

For example, Otsu's method is a method known in the art for binarizing an input graylevel image by performing clustering-based thresholding. The input graylevel image typically contains 2 relatively well differentiated classes of pixels: foreground pixels and background pixels. Otsu's method computes a threshold which is suitable for separating the pixels into two classes:

i. minimizes intra-class variance e.g. minimizes the standard deviation (std) of each of the two clusters, or
   ii. maximizes inter-class variance.

Operation C partition the histogram according to the threshold thereby to define left and right histograms. Assume the left histogram is the foreground (text) whereas the right histogram is the background (non-text, which is normally to the right because the non-text is normally bright whereas the text is normally darker (e.g. black)).

Operation D normalize the text (e.g. Left) histogram by dividing each of the pixel values in the text (e.g. Left) histogram by the sum of all pixel values in the text (e.g. Left) histogram Operation E extract text monotony indicator typically from text (e.g. Left) histogram e.g. compute entropy of the text (e.g. Left) histogram Operation F normalize the text monotony indicator so artifacts of the text monotony indicator computation process do not affect the text monotony indicator's value. For example, if a e.g. left histogram entropy value is used, normalize same to the number of the bins in the left histogram e.g. e.g. as described in FIG. 3, so that the number of bins does not affect the entropy value.

Operation G. compare normalized entropy (say) found in operation F to monotony parameter Threshold/s (or more generally, text monotony indicator threshold/s) determined in operation 10, thereby to make a binary authentic/forged decision (or tertiary authentic/inconclusive/forged decision Operation H. increment window position P:=P+1

Operations other than some which are self-explanatory are now described in detail, according to certain embodiments:

A. This operation may include computing the histogram of the field to be checked (or of a portion of the field e.g. only 2-3 characters therein) e.g. by histogramming the gray level values of the pixels included in the field to be checked (or of a portion of the field e.g. only 2-3 characters therein)

B. This operation may include computing a cut-off point which best separates the histogram generated in operation A, into two classes.

For example, Otsu's method is a method known in the art for binarizing an input graylevel image by performing clustering-based thresholding. The input graylevel image typically contains 2 relatively well differentiated classes of pixels: foreground pixels and background pixels. Otsu's method computes a cut-off point which is suitable for separating the pixels into two classes (clusters), one below the cut-off point (left cluster) and one above (right cluster) because the cut-off point i. minimizes intra-class variance e.g. minimizes the standard deviation (std) of each of the two clusters, or
   ii. maximizes inter-class variance.

I, ii may be equivalent criteria of cut-off point bestness e.g. if the sum of pairwise squared distances is constant.

An Otsu-generated cut-off point may be applied to the color values of the pixels in the input gray-level image e.g. if it is desired to generate an output binary image for forgery checking purposes.

Typically, application of Otsu's method to a line of text includes using a moving window and then applying Otsu repeatedly, to each position of the moving window. For example, if a two-character moving window is used on a line of text including 10 alphanumeric characters, an Otsu cut-off point is determined separately for the first 2 characters, then for characters 2 and 3, then for characters 3 and 4, and finally for characters 9 and 10. The window may be 2 or 3 alphanumerical characters wide or any other suitable integer, or may have a predetermined width measured in pixels e.g. 30 (5× 6) pixels or 60 (6× 10) pixels per character.

A "final" Otsu cut-off point for a line of text may then be determined by suitably combining cut-off points over all positions of the moving window e.g. by averaging cut-off points over all positions of the moving window passing over the line of text.

Typically, Otsu's method is applied to the imaged document (or r/g/b component thereof) as originally received rather than to the imaged document (or r/g/b component thereof) as subsequently cropped, rotated and/or binarized.

C. This operation may include partitioning the histogram ("total histogram") according to the threshold thereby to define left and right partial histograms. Assume the left partial histogram is predominantly associated with the foreground (text) whereas the right partial histogram is predominantly associated with the background (non-text, which is normally to the right because the non-text is normally bright whereas the text is normally darker (e.g. black)). It is appreciated however that even the left partial histogram may be associated with a certain amount of background i.e. that which borders on the text. However, the background portions included in the partial histogram predominantly associated with the foreground may be desirable since these portions, rather than creating noise, may in fact contribute to the entropy-based forgery test herein. The "twilight area" between text and background may be particularly indicative in that the monotony of the "twilight area" may differ between forgeries and authentic documents, typically in that the "twilight area" is more dichotomous in post-processed (and sometimes other) forgeries vs. being smoother in authentic documents e.g. which have not been post-processed. Therefore, M may be selected so as to retain at least some, or as many as possible, "twilight" pixels in the partial histogram predominantly associated with the foreground. This may be achieved either directly or, e.g. as described herein, indirectly e.g. by finding M values which cause least type 1 and/or 2 errors (possibly inter alia due to the "twilight" pixels' indicative level of monotony).

D. This operation may include normalizing the text (e.g. Left) histogram by dividing each of the pixel values in the text (e.g. Left) histogram by the sum of all pixel values in the text (e.g. Left) histogram (such that the sum of all normalized pixel values in the text (e.g. Left) histogram, will be 1).

The default assumption may be that the left portion of the histogram is that related to the text (that is predominantly associated with the foreground). However, optionally, a data repository may be maintained indicating whether certain types of documents are characterized by light text on dark background in which case if an image is pre-recognized as being one of these (e.g. using machine learning techniques such as any of those described in co-owned Published European Patent Application EP2737437, entitled "System And Methods For Computerized Machine-Learning Based Authentication Of Electronic Documents . . . " then the right histogram, rather than the left histogram, is normalized. Or, any other technology may be employed to determine whether a particular document or document-type is characterized by light text on dark background or by the more conventional dark text on light background, such as counting dark and light pixels and determining whether the total number of dark pixels is larger than (suggesting light text on dark background) or smaller than (suggesting dark text on light background) the total number of light pixels.

Operation E In this operation, the method may compute the entropy (e.g. Renyi entroy, or Shannon entropy may be used for quantifying uncertainty) of the text (e.g. Left) histogram, e.g. using:

$$H = -\sum_i p_i (\log_2 p_i)$$

Where the possible outcomes i (index over events) have probabilities p_i. Each outcome may for example correspond to one of the bins or intervals or bars of the histogram. Any log (any base) may be employed such as but not limited to base 2. Alternatively or in addition the entropy of the entire histogram may be computed.

Typically, an extent to which a histogram is monotonic is generally indicative that the data histogrammed comes from an authentic ID document. The entropy of the left cluster (e.g. portion of the histogram associated with lower gray values which normally are characteristic of text—as opposed to background which is normally associated with higher gray values) indicates an extent to which the text is monotonic which is particularly indicative that the data histogrammed comes from an authentic ID document.

Operation F. This operation may include normalizing the entropy to the number of bins in the histogram so that the number of bins does not affect the entropy value. For example, operations f1, f2 in FIG. 3 may be employed.

Operation G. In this operation, the method may apply the monotony threshold determined in operation 10 of FIG. 1, to normalized entropy value found in operation F, thereby to make a binary authentic/forged decision either for the image as a whole or for a single line of text therein or a single channel (r, g, or b) thereof.

It is appreciated that steps A-G are typically performed repeatedly, typically p times for the p positions of the moving window. Any suitable interval may be employed between consecutive positions of the moving window, such as the width of 1 character.

An advantage of defining "inconclusive" values (say: values of entropy falling between 0.5 and 0.7) is that each organization may thereby be able to easily introduce its own flavor of the general process by configuring its own desired treatment of "inconclusive" entropy values at each level, possibly from among preprogrammed options procedure such as but not limited to: send to manual inspection by human operator, ask end user to re-scan, utilize or attempt to utilize other tests or criteria if it is known that such exist or may exist, lump together with forged, lump together with authentic, or logical combinations of these. However according to an alternative embodiment, there is no "inconclusive" sub-range and instead, the range of possible values includes only 2 subranges: authentic and forged.

FIG. 3 is a simplified flowchart illustration of an entropy normalization method. The method of FIG. 3 may include operation F1 and/or F2, suitably ordered e.g. as shown.

These operations are now described, according to certain embodiments and other than what is self-explanatory:

Operation F1. In this operation, typically, the width of some predetermined percentage lower than 100%, such as 70%6, 80%, 90%, 95%, 99%, is computed, to avoid noise by disregarding outlying pixel values. To do this, the width (W) of the middle 90% (say) of the bins in the text (e.g. Left) histogram may be computed. For example, after normalization of 100% of bins (operation D in FIG. 2) determine the % of gray values in each bin in the leftmost end of the left partial-histogram (and/or in each bin in the rightmost end of the right partial-histogram). Determine how many bins at the leftmost (rightmost) end are needed to accumulate 10% of the total gray values; then disregard these bins and compute entropy only for the remaining bins which "hold" 90%/c of the gray values. For example, if the first 4 bins from the left, bin0-bin3, hold 1%, 3%, 1.5% and 4.5% respectively, compute entropy only for the remaining bins i.e. bin4, bin5, . . . .

Operation f1 may be performed for each incoming identity document provided by a remote end-user, or may be performed during set-up for representative members of each or certain supported document types.

Operation F2. This operation may include computing M=H/log(W) which is a number from 0 to 1 which indicates an extent to which the text (e.g. Left) histogram is monotonic. For example, if M<=0.5 then the document may be considered to be forged, whereas if M>=0.7 then the identity document may be considered to be forged in view of the relatively large degree of monotony.

Typically, all of operations 10-80 of FIG. 1 and the method of FIG. 2, are performed during set-up analysis for each document in sets 1 and 2, but operation g in FIG. 2 is performed several times for each of several possible values for m. It is appreciated that typically, both during set-up and in real time functioning, operations a-g are performed for each window (for each position of a moving window).

Still regarding the method of FIGS. 1-3, it is appreciated that any suitable logic may be employed to combine per-window position, per-channel, per-field authentic/inconclusive/forged decisions, or authentic/forged decisions, over window positions ("windows"), channels and fields; the particular logic illustrated in FIGS. 1-3, in which a single "forged" decision at any level (e.g. for any one window position, channel or field) overrules many "authentic" decisions at the same level, is not intended to be limiting. Also, the per-window position, per-channel, per-field outputs may each comprise a continuous value for combination with other continuous values in other window positions, channels or fields, rather than combining, over window positions, channels or fields, values which have been pre-thresholded into 2 (authentic/forged) or 3 (authentic/inconclusive/forged) categories. Also, combination of data over window positions, channels or fields may occur in any suitable order, for example, data may be combined over window positions then over fields then over channels, or over window positions then over channels then over fields.

According to certain embodiments, data repositories are maintained storing locations of various fields in various types of ID documents. Then, entropy may be quantified throughout extensive areas in the document. If low-entropy areas coincide with previously known locations of areas likely to be forged, a "score" determining whether the document is genuine or is forged may be adjusted in the "forged" direction. For example, if the lowest entropy area in the document coincides with the previously known location of the ID document bearer's last name or year of birth (in its entirety or last two digits thereof), the document's score may reflect a higher likelihood that the document is forged, since the "last name" and year of birth fields are among the fields most likely to be forged.

Certain embodiments of the method and system described herein are particularly useful for digital photos of, or scans of, ID documents produced by remote end-users using a plethora of often poor quality digital imagining devices such as smart-phone cameras, digital cameras, home or office scanners, or webcams, operated in sub-optimal lighting conditions, and subsequently emailed or uploaded (via online applications or websites) to a remote server operative for authenticating the document image thus received rather than authenticating a physical document scanned en situ using quality equipment and optimal lighting conditions.

Certain embodiments of the method and system described herein allow fully automated authentication which in turn allows on-line services to respond to end-users in real time rather than after hours or even more than a day, due to the need to rely on slow manual (human) authentication.

Certain embodiments of the method and system described herein are useful in identifying those post-processed forgeries which are effected using a graphic tool e.g. mouse and working at a resolution which merely causes the forged text to appear genuine at normal magnification to the naked eye but is not accurate at the pixel level, or one order of magnitude above or below pixel level.

Certain embodiments of the method and system described herein are useful in identifying those post-processed forgeries which use a low-resolution input image of a document to be forged and are effected at that low resolution. For example, the low-resolution input image of a document to be forged may be generated by a mobile phone whose resolution is coarser than the dpi of the printer which generated the document.

Devices used to image digital documents to be provided to the server performing the method/s shown and described herein may include inter alia any mobile communication device such as but not be limited to any of the following: mobile telephone, smart phone, playstation, iPad, TV, remote desktop computer, game console, tablet, mobile e.g. laptop or other computer terminal, embedded remote unit.

The methods shown and described herein are particularly useful in processing e.g. in real time or near real time, of incoming document streams including hundreds, thousands, tens of thousands, or hundreds of thousands of electronic documents using computerized technology.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A document forgery detection method comprising using at least one processor for:
    providing at least one histogram of gray level values occurring in at least a portion of at least one channel of an image assumed to represent a document including text, the histogram having been generated by image processing at least a portion of at least one channel of an image assumed to represent a document including text, the image having been sent by a remote end user to an online service over a computer network;
    evaluating monotony of at least a portion of the at least one histogram; and
    determining whether the image is authentic or forged based on at least one output of said evaluating,
    wherein said evaluating monotony of at least a portion of the at least one histogram includes identifying plural peaks in at least a portion of said histogram using an automated technology for dividing a dataset into clusters; and
    wherein said automated technology for dividing a dataset into clusters is used to determine a cut-off point separating the histogram into plural classes, for each of multiple positions of a moving window passing over at least a portion of the image.

2. A method according to claim 1 wherein said image processing at least a portion of an image comprises identifying an image portion by identifying at least one line of text in said image.

3. A method according to claim 1 wherein said image processing comprises identifying at least one line of text in said image and wherein the moving window passes over said line of text.

4. A method according to claim 1 wherein said automated technology for dividing a dataset into clusters comprises at least one of the following data clustering technologies: Otsu, Jenks, Jenks-Fisher.

5. A method according to claim 1 wherein said evaluating monotony comprises computing entropy of at least a portion of a second histogram derivable from the at least one histogram and comparing a value derivable from said entropy to a predetermined threshold.

6. A method according to claim 5 wherein said second histogram derivable from the at least one histogram is generated by normalizing said at least one histogram.

7. A method according to claim 5 wherein said value is derived by normalizing said entropy.

8. A method according to claim 1 wherein said image processing and said evaluating are performed for plural portions of at least one channel of the image, thereby to define plural outputs of said evaluating and wherein said determining includes combining said plural outputs.

9. A method according to claim 1 wherein said image processing and said evaluating are performed for at least one portion of plural channels of the image, thereby to define plural outputs of said evaluating and wherein said determining includes combining said plural outputs.

10. A method according to claim 1 wherein said providing comprises image processing at least a portion of at least one channel of an image assumed to represent a document including text, the image having been sent by a remote end user to an online service over a computer network, thereby to generate said at least one histogram of gray level values occurring in at least a portion of at least one channel of the image.

11. A document forgery detection system operative in conjunction with an online service and a computer network, the system comprising:

An image processor configured to image process at least a portion of at least one channel of an image assumed to represent a document including text, the image having been sent by a remote end user to the online service over the computer network, the image processing including generating at least one histogram of gray level values occurring in at least a portion of at least one channel of the image; and an output generator operative to make a determination of whether the image is authentic or forged based on at least one output of a monotony evaluating processor configured to evaluate monotony of at least a portion of the at least one histogram; and to provide said determination to the online service, wherein said monotony evaluating processor configured to evaluate monotony of at least a portion of the at least one histogram includes identifying plural peaks in at least a portion of said histogram using an automated technology for dividing a dataset into clusters; and wherein said automated technology for dividing a dataset into clusters is used to determine a cut-off point separating the histogram into plural classes, for each of multiple positions of a moving window passing over at least a portion of the image.

12. A system according to claim 11 and also comprising a monotony evaluating processor configured to evaluate monotony of at least a portion of the at least one histogram and to provide at least one output accordingly, to the output generator.

13. A system according to claim 12 wherein said monotony evaluating processor uses entropy as a diversity indicator.

14. A system according to claim 13 wherein said entropy comprises Shannon entropy.

15. A computer program product, comprising a non-transitory tangible computer readable medium having computer readable program code embodied therein, said computer readable program code adapted to be executed to implement a document forgery detection method comprising using at least one processor for:

providing at least one histogram of gray level values occurring in at least a portion of at least one channel of an image assumed to represent a document including text, the histogram having been generated by image processing at least a portion of at least one channel of an image assumed to represent a document including text, the image having been sent by a remote end user to an online service over a computer network;

evaluating monotony of at least a portion of the at least one histogram; and determining whether the image is authentic or forged based on at least one output of said evaluating, wherein said evaluating monotony of at least a portion of the at least one histogram includes identifying plural peaks in at least a portion of said histogram using an automated technology for dividing a dataset into clusters; and wherein said automated technology for dividing a dataset into clusters is used to determine a cut-off point separating the histogram into plural classes, for each of multiple positions of a moving window passing over at least a portion of the image.

* * * * *